United States Patent [19]
Green

[11] 3,799,588
[45] Mar. 26, 1974

[54] ADAPTOR ASSEMBLIES FOR CONNECTING COMPLEMENTARY MEMBERS

[75] Inventor: Martin Green, Solihull, England

[73] Assignee: Girling Limited, Birmingham, England

[22] Filed: Jan. 31, 1972

[21] Appl. No.: 221,970

[30] Foreign Application Priority Data
Feb. 5, 1971 Great Britain..................... 4099/71
Mar. 4, 1971 Great Britain..................... 6073/71
July 10, 1971 Great Britain................... 32483/71

[52] U.S. Cl................. 285/158, 285/235, 285/174
[51] Int. Cl.................................................. F16l 5/02
[58] Field of Search ............. 60/54.6; 285/158, 235, 285/223, DIG. 22, 237, 236, 174, 175, 234, 13, 239, 233; 16/2

[56] References Cited
UNITED STATES PATENTS

| | | | |
|---|---|---|---|
| 2,364,447 | 12/1944 | Hynes | 285/234 |
| 2,983,506 | 5/1961 | Bertsch et al. | 285/233 |
| 2,889,089 | 6/1959 | Herrick et al. | 285/DIG. 22 |
| 1,166,059 | 12/1915 | Ledbetter | 285/239 |
| 3,498,644 | 3/1970 | Davies et al. | 285/212 |
| 3,565,466 | 2/1971 | Mullings | 285/158 |
| 2,816,950 | 12/1957 | Kruss et al. | 16/2 |
| 3,237,412 | 3/1966 | Ferrell | 60/54.6 R |

FOREIGN PATENTS OR APPLICATIONS

| | | | |
|---|---|---|---|
| 998,697 | 9/1951 | France | 60/54.6 R |
| 1,180,098 | 4/1970 | Great Britain | 285/158 |

Primary Examiner—Dave W. Arola
Attorney, Agent, or Firm—Scrivener, Parker, Scrivener & Clark

[57] ABSTRACT

In an adaptor assembly for providing a fluid-tight sealed connection between a pair of complementary members of which at least one of the members is provided with a recess, the adaptor assembly comprises a bush of resilient material for sealing engagement in the recess at least at one end, a tubular member for providing fluid-flow communication between the complementary members received within a through bore in the bush, and an enlarged head at one end of the tubular member located adjacent to the said one end of the bush to prevent restriction of the tubular member by the material of the bush.

7 Claims, 5 Drawing Figures

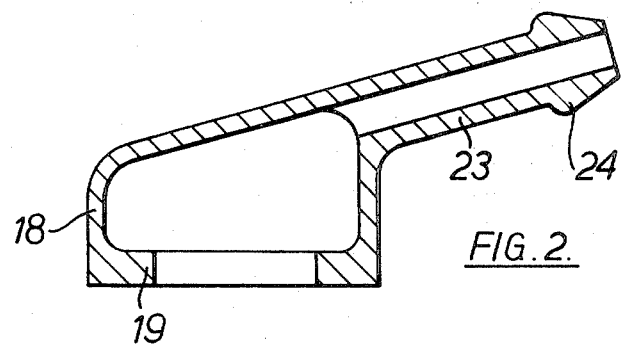
FIG. 2.
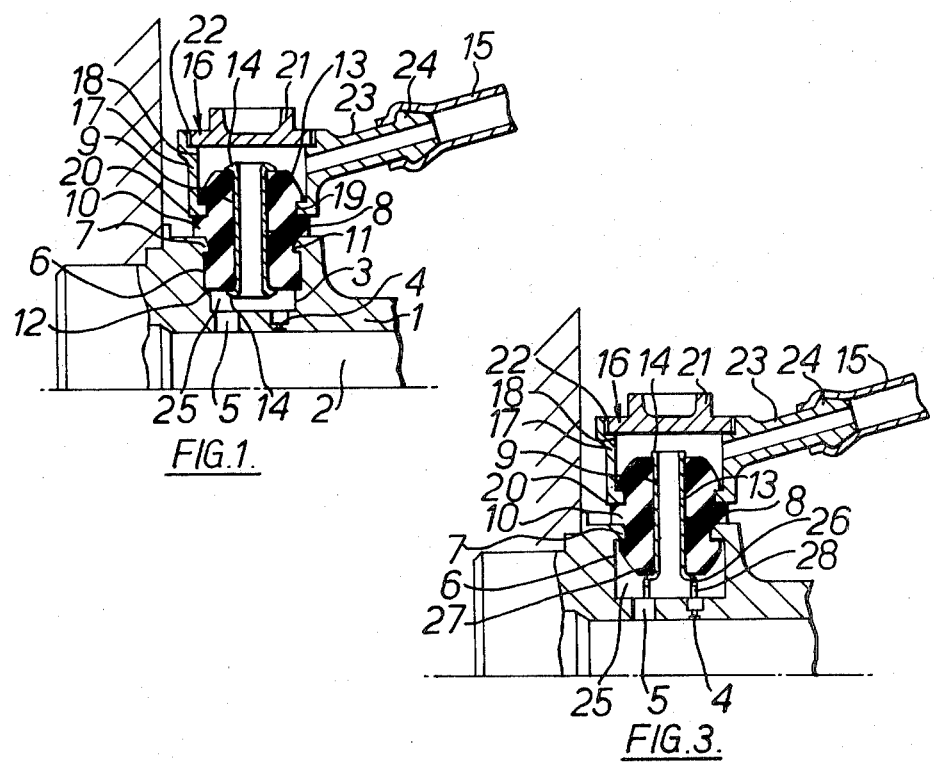
FIG.1.
FIG.3.

ADAPTOR ASSEMBLIES FOR CONNECTING COMPLEMENTARY MEMBERS

This invention relates to a new or improved adaptor assembly for providing a fluid-tight sealed connection between a pair of complementary members, for example between a master cylinder for an hydraulic system and a reservoir for hydraulic fluid.

It is known to make a direct fluid-tight sealed connection between a master cylinder and a reservoir by the provision of an adaptor assembly comprising a bush of resilient material which is sealingly connected to complementary parts of the master cylinder and the reservoir in which a tubular member is inserted through a through bore in the bush to provide connection between the reservoir and the master cylinder and to confine the material of the bush against extension in at least a radially inwards direction. In such a known construction the tubular member can slide with respect to the bush with the result that a port in the wall of the master cylinder connecting with a pressure space may become obstructed. In addition the bush may become distorted or otherwise extend in radially inwards direction with respect to the tubular member with the result that the passage defined by the tubular member may become at least partially obstructed.

According to our invention in an adaptor assembly for providing a fluid-tight sealed connection between a pair of complementary members of which at least one of the members is provided with a recess, the adaptor assembly comprises a bush of resilient material for sealing engagement in the recess at least at one end, a tubular member for providing fluid-flow communication between the complementary members received within a through bore in the bush, and an enlarged head at one end of the tubular member located adjacent to the said one end of the bush to prevent restriction of the tubular member by the material of the bush.

The enlarged head extends radially outwards with respect to the through bore and may engage with, or be located in close proximity with respect to, an annulus at the said one end of the bush which surrounds the bore. Alternatively the through bore is counter-bored at the said one end of the bush and the enlarged head is located within the counterbore. Preferably the enlarged head is spaced from a shoulder at the step in diameter between the bore and the counterbore.

The enlarged head may be provided with an apertured axial extension for engagement with the base of the annular recess in the said one member.

The tubular member may project from the opposite end of the bush remote from the said one end at least by a short distance. That end of the tubular member may also be formed with an enlarged head extending radially outwards with respect to the through bore and may engage with, or be located in close proximity with respect to, an annulus at the said opposite end of the bush which surrounds the through bore. That end of the tubular member may communicate with the other member either directly, or indirectly through an intermediate adaptor. Alternatively that end of the tubular member may be provided with an extension for fluid-tight connection to the other member, for example by means of a flexible hose.

Conveniently the bush may be formed at an intermediate point in its length with a radial groove adapted to receive an annular flange extending inwardly from a cylindrical wall of the recess to form a fluid-tight connection between the adaptor assembly and the said one member.

Some embodiments of our invention are illustrated in the accompanying drawings in which:

FIG. 1 is a longitudinal section through a portion of a wall of a master cylinder including a section through a connection between a master cylinder and a hose incorporating an adaptor;

FIG. 2 is a longitudinal section of a modified adaptor;

FIG. 3 is a section similar to FIG. 1 but showing a modification;

Figure 4:
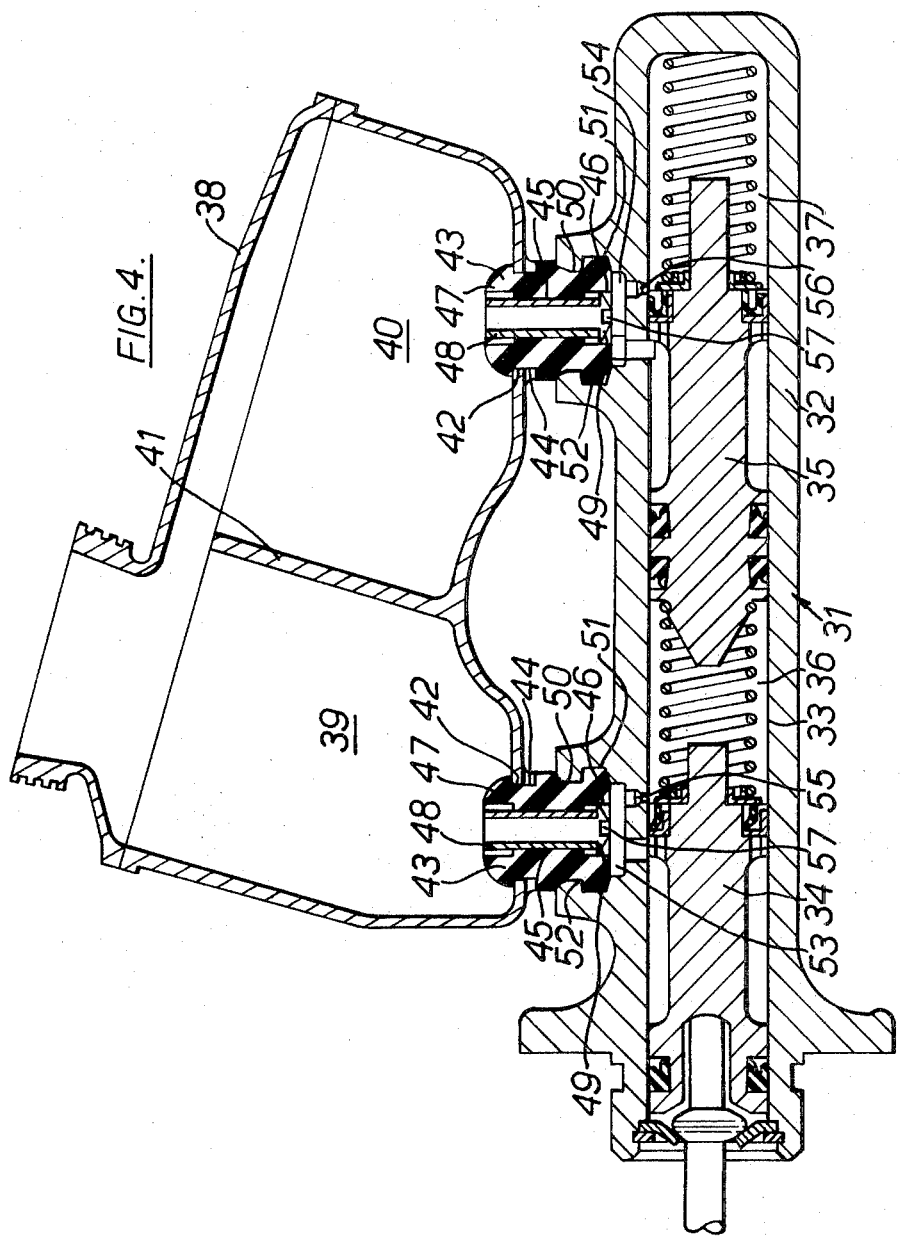
FIG. 4 is a longitudinal section through a combined tandem master cylinder and reservoir assembly for an hydraulic braking system.

In the embodiment of FIG. 1 of the drawings 1 is a portion of the wall of the body of an hydraulic master cylinder for an hydraulic system, conveniently an hydraulic braking system. The wall of the body surrounds a cylindrical bore 2 in which works a piston (not shown). A blind radial bore or recess 3 of substantial diameter normally communicates with a pressure space in the cylindrical bore 2 in front of the piston through a recuperation port 4 and a bleed port 5 which is spaced axially from the recuperation port 4, both of said ports being offset from the axis of the recess. The radial bore 3 is counterbored at 6 and at its outermost end the counterbore 6 is formed with an inwardly projecting radial bead or lip 7.

The master cylinder is adapted to be connected to a reservoir for hydraulic fluid by means of an adaptor assembly in accordance with our invention. As illustrated the adaptor assembly comprises a bush 8 of resilient material, conveniently natural or synthetic rubber, having a central through bore 9. The bush 8 is provided at an intermediate point in its length with an outwardly extending radial flange 10 which engages sealingly with a complementary seating on the body of the master cylinder when one end of the bush 8 is inserted into the counterbore 6. In that position the bead or lip 7 is received in an annular groove 11 below the flange 10 and the inner end of the bush 8 engages sealingly with a shoulder 12 at the step in diameter between the bore 3 and the countebore 6.

The bush 8 is confined against extension in at least a radially inwards direction by means of a rigid tubular member in the form of a central rigid tube 13 which is inserted through the bore 9 in the bush 8 and of which opposite ends are belled out or expanded to form opposed radial lips 14 engaging with opposite ends of the bush 8. The lips 14 define enlarged heads which prevent the material of the bush from obstructing the bore of the tube 13, and the tube and the bush moving axially with respect to each other.

A connection is made between the tube 13 and a hose 15 connected to a reservoir for hydraulic fluid (not shown) through an adaptor 16.

The adaptor 16 includes a body portion 17 in the form of a moulding or synthetic plastics material. The body portion comprises a cylindrical wall 18 formed at one end with an inwardly directed radial flange 19 which is sealingly received and retained in an annular groove 20 in the wall of the bush 8 above annular flange 10 and located in a position such that the upper face of the flange 10 is continuous with and defines a portion of the lower face of the groove 20.

A plug 21 in the form of a disc comprising a moulding of synthetic plastics material is inserted into a counter-bored recess 22 in the end of the cylindrical wall 18 remote from the flange and is welded in position to form a closure for that end of the body portion 17.

An extension in the form of a tube 23 integral with the wall 18 extends outwardly therefrom and is inclined inwardly with respect to the plane of the flange 19. The outer end of the tube 23 is formed with an outwardly directed radial shoulder 24 of coned outline over which is slipped the end of the hose 15 remote from the reservoir.

A chamber 25 between the shoulder 12 and the base of the radial bore 3 is at all times in communication with the reservoir through the rigid tube 23 and the interior of the adaptor 16. When the master cylinder is in a normal inoperative position the chamber 25 communicates with the pressure space in the cylinder bore 2 in front of the piston at least through the recuperation port 4.

The adaptor illustrated in FIG. 2 comprises a one-piece moulding of synthetic plastics material. That adaptor is interchangeable with and otherwise substantially identical with the adaptor described above and corresponding reference numerals have been applied to corresponding parts.

In the construction illustrated in FIG. 3 the bead or lip 7 is in the form of a radial flange located at the outer end of the radial bore 3 which is of a constant diameter between the flange 7 and its base in which the recuperation port 4 and the bleed port 5 are located.

The bush 8 is symmetrical in outline being provided on opposite sides of the flange 10, which engages sealingly between complementary seatings on the flanges 19 and 7, with the annular grooves 20 and 11 which are substantially identical in outline and which sealingly receive the flanges 19 and 7. In this position the lower end of the bush 8 is spaced from the base of the bore 3 and there is a clearance between the circumferential surface of the bush 8 and the bore 3.

The tubular member comprising the tube 13 is inserted into the central through bore 9 in the bush 8, to confine the bush against extension in a radially inwards direction. The tube has a portion 26 of enlarged increased diameter defining an enlarged head which projects from the inner end of the bush 8. The portion 26 is of an axial length equal to the distance by which the lower end of the bush is spaced from the base of the bore 3. The free end of the portion 26 engages with the base of the bore 3 and a shoulder 27 at a step in diameter between the portion 26 and the remainder of the member 24 which is of a constant diameter throughout its length engages with the inner end of the bush 8. Thus the free end of the portion 26 and the shoulder 27 act as stops to limit the distance by which the bush 8 can be inserted into the bore 3 thus ensuring that effective seals are maintained between the flange 7 and the walls of the groove 11, including the flange 10. Also the material of the bush is confined between the head 14 and the portion 26 which prevent the material of the bush from obstructing the bore 4 of the tube 13.

The free end of the portion 26 which engages with the base of the bore 3 is formed with a series of notches serrations or teeth 28 of which the crests engage with the base of the bore 3 and the openings between adjacent teeth define apertures to ensure free communication at all times between the interior of the tube 13 and the axially offset ports 4 and 5.

The tube 13 is preferably formed as a one-piece moulding of synthetic plastics material, conveniently nylon.

The construction and operation of the embodiment of FIG. 3 is otherwise the same as that described above with reference to FIG. 1 and corresponding reference numerals have been applied to corresponding parts.

In the combined tandem master cylinder and reservoir assembly illustrated in FIG. 4 of the drawings 31 is a tandem master cylinder comprising a bore 32 having a longitudinally extending bore 33 in which works a positively actuated main piston 34 and a floating or secondary piston 35 located between the piston 34 and the closed end of the bore.

A pressure space 36 is defined within the bore between adjacent ends of the piston 34 and 35, and a secondary pressure space 37 is defined within the bore between the end of the piston 34 remote from the piston 33 and the adjacent closed end of the bore.

A reservoir 38 for fluid is mounted on the body 32 in a fluid-tight manner by means of two adaptor assemblies in accordance with our invention.

As illustrated in the drawings the reservoir 38 comprises a elongate container divided into compartments 39 and 40 by a transverse partition 41. The base of each compartment is formed with an opening 42 in which is inserted the upper end of a bush 43 of resilient material, conveniently of rubber or synthetic plastics material, so that the wall surrounding the opening is received in a radial groove 44 in the bush. Each bush 43 is formed with longitudinally extending through bore 45 which is counterbored at 46 at its lower free end, and at its upper end at 47.

A tubular member 48 in the form of a tube is inserted into the bore 45 through the counterbore 46 until an enlarged head 49 at the lower end of the tubular member is substantially aligned with the lower end of the bush 43, the counterbore 47 providing a "lead" to facilitate insertion of the tubular member 48 into the bore 45.

The bushes 43 are then inserted into longitudinally spaced recesses 50 in the body 32. Each recess 50 is of substantially constant diameter through its axial length but at an intermediate point in its length is formed with a radial groove 51 which receives a radial flange 52 terminating at the free end of the bush 43. Chambers 53 and 54 between the bases of the recess and the lower end of the bushes 43 normally communicate with the pressure space 36 and 37 through recuperation ports 55 and 56 in the wall of the body. Thus, in the position shown in the drawings, the pressure spaces 36 and 37 are in communication with the reservoir chambers 39 and 40 through the tubular members 48.

The head 49 of each tubular member 48 is provided with a diametrical slot 57 so that the interiors of the member 48 are at all times in communication with the chamber 53 and 54 and as a consequence with the pressure spaces with which the tubulars member is in communication, irrespective of the axial position of the tubular members 48 with respect to the bush 43 in which they are located. Thus, should a head 49 accidently contact the base of the recess 50 in which it is located, the reservoir will still communicate with the pressure space 36 or 37 through at least one diametrical passage 57.

The provisional of the tubular members 48 ensures that the reservoir 38 is at all times in communication with the recuperation ports 55 and 56. Furthermore the tubular members 48 retain the bushes 43 against deformation in a radially inwards direction thereby enhancing the effectiveness of the fluid-tight seals formed between the reservoir 38 and the body 32 by the bushes 43. The provisional of the counterbores 46 and 47 ensure that the free ends of the tubular members are spaced radially inwards from the corresponding ends of the bushes so that there is no possibility of the bores of the tubular members 48 being obstructed by the material of the bushes.

The further construction and operation of the master cylinder is well known and need not be described further herein.

Figure 5:
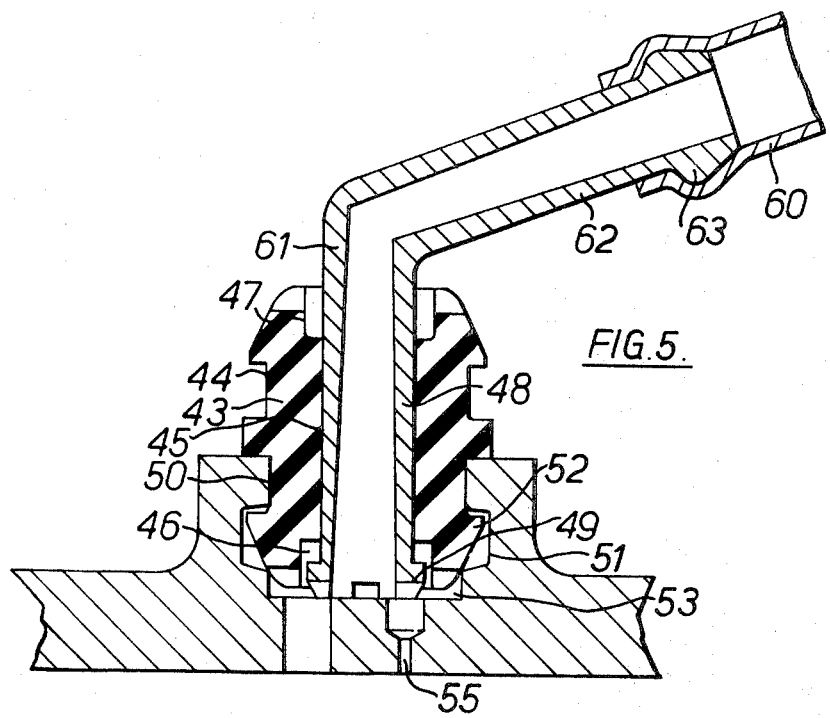
FIG. 5 is a section similar to FIG. 1 but showing a further modification.

In the embodiment of FIG. 5 a reservoir for fluid (not shown) is adapted to be connected to the pressure space of a master cylinder through a flexible hose or pipe 60 and an adaptor assembly as described above with reference to the embodiment of FIG. 4. In this construction the tubular member 48 is provided at the end remote from the enlarged head 49 with an axial extension 61 continuous with and leading into an outwardly inclined portion 62 provided at its free end with an outwardly directed radial shoulder 63 of coned outline over which is slipped the end of the hose 60 remote from the reservoir to form a fluid-tight seal.

The construction of the adaptor assembly illustrated in FIG. 5 is otherwise the same as that described above with reference to FIG. 4 and corresponding reference numerals have been applied to corresponding parts.

I claim:

1. In a combined master cylinder and reservoir assembly wherein the body of said master cylinder has a recess communicating with the master cylinder and defined by side walls and a base, and an annular flange extending inwardly from said walls, an adaptor assembly comprising a bush of resilient material in sealing engagement with said side walls of said recess and having a through bore, a first annular groove formed at an intermediate point in the length of said bush and receiving said flange, a tubular member extending through said bore, an enlarged head at the end of said tubular member adjacent said base of said recess, an adaptor having an annular flange received in a second annular groove in said bush, and a tubular extension from said adaptor connected to said reservoir through a hose.

2. In a combined master cylinder and reservoir assembly wherein the body of said master cylinder has a recess communicating with the master cylinder and defined by side walls and a base, and an annular flange extending inwardly from said walls, an adaptor assembly comprising a bush of resilient material in sealing engagement with the side walls of said recess and having a through bore, a first annular groove formed at an intermediate point in the length of the bush and receiving said flange, a tubular member extending through said bore, an enlarged head at the end of said tubular member adjacent said base of said recess, and a second annular groove in said bush receiving an annular flange surrounding an outlet opening from said reservoir, the bush permitting some relative movement between said master cylinder and said reservoir.

3. In a fluid connection between a pair of complementary members of which at least one of the members is provided with a recess defined by side walls and a base, an adaptor assembly comprising a bush of resilient material having an axial through bore and being a push fit in said recess to make a sealing engagement with said side walls of said recess, a tubular member received in said through bore and holding said bush in sealing engagement with said side walls, a fluid opening in said recess inwardly of said bush and offset from the axis of said through bore, an enlarged head at the end of said tubular member adjacent the base of said recess, said enlarged head being provided with radial slots, and means for connecting the end of said tubular member opposite said enlarged head to the second member to provide fluid flow communication between said complmentary members whereby in the event of said head engaging said base of said recess fluid can still flow between said complementary members through the offset opening in said recess.

4. In a connection between a pair of complementary members, an adaptor assembly according to claim 3 wherein the end of said tubular member opposite to said enlarged head projects beyond said bush and is connected to said other complementary member by a flexible hose.

5. In a combined master cylinder and reservoir assembly wherein the body of said master cylinder has a recess defined by side walls and a base, and an annular flange extending inwardly from said walls, an adaptor assembly comprising a bush of resilient material in sealing engagement with the side walls of said recess and having an axial through bore, a fluid opening in said recess inwardly of said bush and offset from the axis of said through bore, a first annular groove formed at an intermediate point in the length of said bush and receiving said annular flange, a tubular member extending through said bore, an enlarged head at the end of said tubular member adjacent said base of said recess, said enlarged head being provided with radial slots, and a flexible hose connecting said reservoir to the end of said tubular member remote from said enlarged head whereby said reservoir and said tubular member are movable relative to each other and in the event of said head engaging said base of said recess, fluid can still flow between the reservoir and the master cylinder through said slots and the offset opening in said recess.

6. In a combined master cylinder and reservoir assembly as in claim 1, said adaptor assembly wherein said enlarged head is provided with radial slots.

7. In a combined master cylinder and reservoir assembly as in claim 2, said adaptor assembly wherein said enlarged head is provided with radial slots.

* * * * *